United States Patent [19]
Williams

[11] Patent Number: 5,813,630
[45] Date of Patent: Sep. 29, 1998

[54] MULTI-MODE SECONDARY POWER UNIT

[75] Inventor: Kenneth R. Williams, Huntington Beach, Calif.

[73] Assignee: McDonnell Douglas Corporation, Huntington Beach, Calif.

[21] Appl. No.: 721,907

[22] Filed: Sep. 27, 1996

[51] Int. Cl.[6] .................................................. B64D 13/00
[52] U.S. Cl. .................................. 244/118.5; 60/39.141; 454/71; 62/136
[58] Field of Search .............................. 244/53 R, 53 A, 244/58, 118.5; 60/39.07, 39.141, 39.142; 62/136, DIG. 5; 454/71, 72, 70

[56] References Cited

U.S. PATENT DOCUMENTS

| | | | |
|---|---|---|---|
| 2,734,443 | 2/1956 | Wood | 454/71 |
| 2,777,301 | 1/1957 | Kuhn | 62/136 |
| 3,177,679 | 4/1965 | Quick et al. | 454/71 |
| 4,091,613 | 5/1978 | Young | 60/39.07 |
| 4,494,372 | 1/1985 | Cronin | 60/39.07 |
| 4,503,666 | 3/1985 | Christoff | 60/39.07 |
| 4,514,976 | 5/1985 | Christoff | 60/39.07 |
| 4,523,517 | 6/1985 | Cronin | 98/1.5 |
| 4,546,939 | 10/1985 | Cronin | 244/118.5 |
| 4,684,081 | 8/1987 | Cronin | 244/58 |
| 4,706,908 | 11/1987 | Huffman et al. | 244/118.5 |
| 5,145,124 | 9/1992 | Brunskill et al. | 244/118.5 |
| 5,299,763 | 4/1994 | Bescoby et al. | 244/118.5 |
| 5,323,603 | 6/1994 | Malohn | 60/39.07 |
| 5,490,645 | 2/1996 | Woodhouse | 244/118.5 |

Primary Examiner—Galen L. Barefoot
Attorney, Agent, or Firm—Harness Dickey & Pierce P.L.C.

[57] ABSTRACT

The present invention provides a multi-mode secondary power unit comprising a first starter/generator unit operably coupled to a shaft. The first starter/generator motor is operable in a motor mode for causing rotational movement of the shaft and is operable in a generator mode for generating electric power from rotational movement of the shaft. A thermal engine is operably coupled to the shaft and is operable in a fuel burning mode for causing rotational movement of said shaft and is operable in a non fuel burning mode for receiving rotational movement from the shaft. A load compressor is operably coupled to the shaft for pressurizing air to a predetermined level.

16 Claims, 2 Drawing Sheets

MULTI-MODE SECONDARY POWER UNIT

BACKGROUND OF THE INVENTION

1. Technical Field

This invention generally relates to auxiliary power units for aircraft and more particularly, to an air conditioning/environmental control module which also serves as a source of electrical power.

2. Discussion

As is generally known in the art of aircraft design, present passenger transport aircraft utilize pressurized air extracted from the engine compressor to provide wing ice protection and cabin pressurization and cooling. Future subsonic transport aircraft engines may produce insufficient bleed air for powering the air-cycle air-conditioning (A/C) and environmental control system (ECS) equipment. The bleed air extracted from the engine is generally too hot for use, and requires cooling in a ram air cooled heat exchanger. This heat exchanger is commonly referred to as a pre-cooler. The pre-cooler wastes much of the energy invested in the bleed air and results in ram air drag. Furthermore, air-cycle machines require an inter-cooler to perform the air chilling function, again wasting energy through heat dissipation and ram air drag.

It is also probable that future aircraft will be equipped with secondary power systems which produce electrical secondary power only from shaft driven equipment mounted on the main thrust engines or from gearboxes driven by the engines. With a single type of secondary power, in lieu of the present mix of electrical, hydraulic, and electrical secondary power, it is likely that additional emergency power generators will be required for system redundancy and reliability. However, this will result in substantial additional equipment being installed on the aircraft, likely in the form of extra electrical generators and additional shaft driven cooling equipment.

The present invention is significantly different from other known systems since it does not extract bleed air from the engine, and the bi-directional power flow between the Multi-Mode Secondary Power Unit (MMSPU), the engine and the aircraft secondary power system is electrical. This makes the MMSPU an ideal companion for the More Electric Airplane (MEA) concepts currently being investigated by the Air Force and NASA. These aircraft will use electric starters to start the main engines, and will require substantial electrical ground power or an Auxiliary Power Unit (APU) with very large generators.

In an aircraft equipped with the present invention operating in the fuel-burning mode described below, electrical power will be available to start the MEA main engines. When electrical ground power is available, all services in the aircraft may be provided by the present invention. Furthermore, the present invention allows any aircraft to operate on the ground using only one type of ground support cart.

SUMMARY OF THE INVENTION

The above and other objects are provided by an integrated system including a modified aircraft auxiliary power unit, preferably of the gas turbine type, combined with a motor/generator unit and a load compressor. The system produces an air conditioning/environmental control module which also may serve as a source of electrical power. The electrical power may be used during emergency power outages or to start the main thrust engine. More particularly, the present invention includes a multi-mode secondary power unit comprising a first starter/generator unit operably coupled to a shaft. The first starter/generator motor is operable in a motor mode for causing rotational movement of the shaft and is operable in a generator mode for generating electric power from rotational movement of the shaft. A thermal engine is operably coupled to the shaft and is operable in a fuel burning mode for causing rotational movement of said shaft and is operable in a non-fuel burning mode for receiving rotational movement from the shaft. A load compressor is operably coupled to the shaft for pressurizing air to a predetermined level.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention, generally referred to hereinafter as the Multi-Mode Secondary Power Unit or MMSPU, utilizes a modified aircraft auxiliary power unit, preferably of the gas turbine type, combined with a motor/generator unit and a load compressor to produce an air conditioning/environmental control module which also serves as a source of electrical power.

Figure 1:
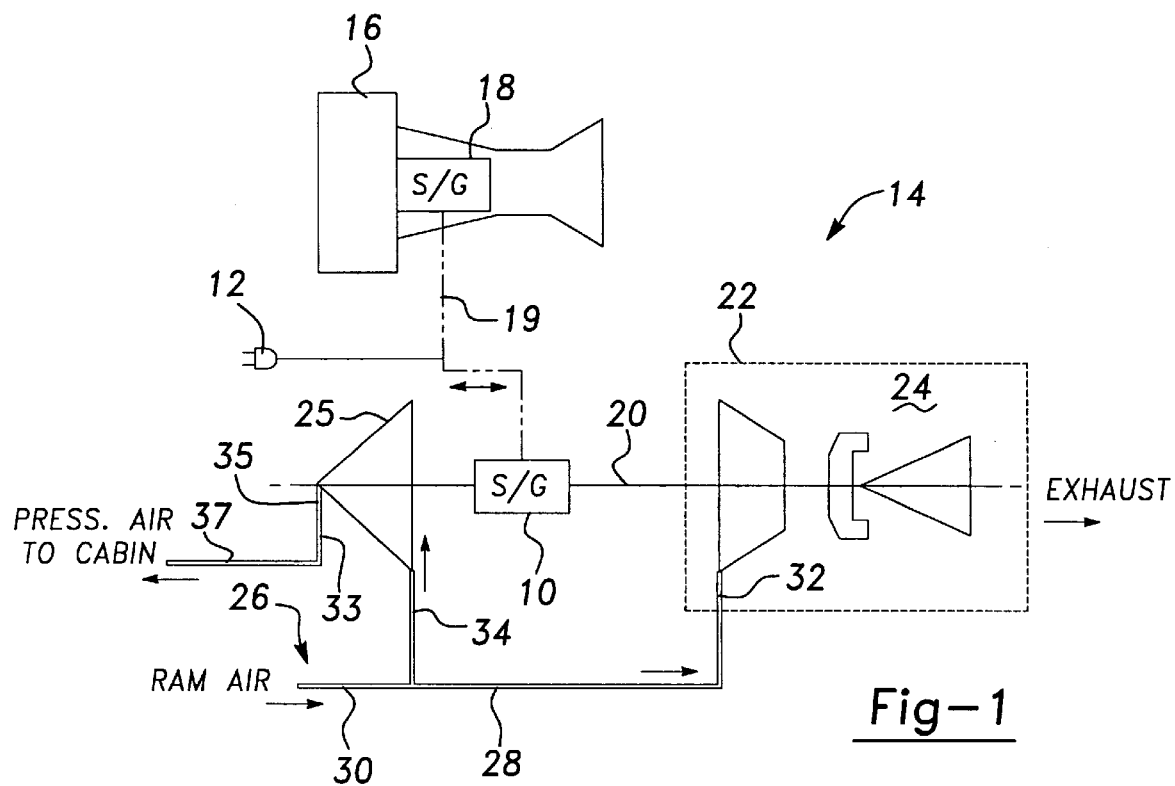
FIG. 1 is a schematic view of a first embodiment of the present invention configured as a conventional auxiliary power unit with a load compressor and an a/c motor/generator.
Figure 2:
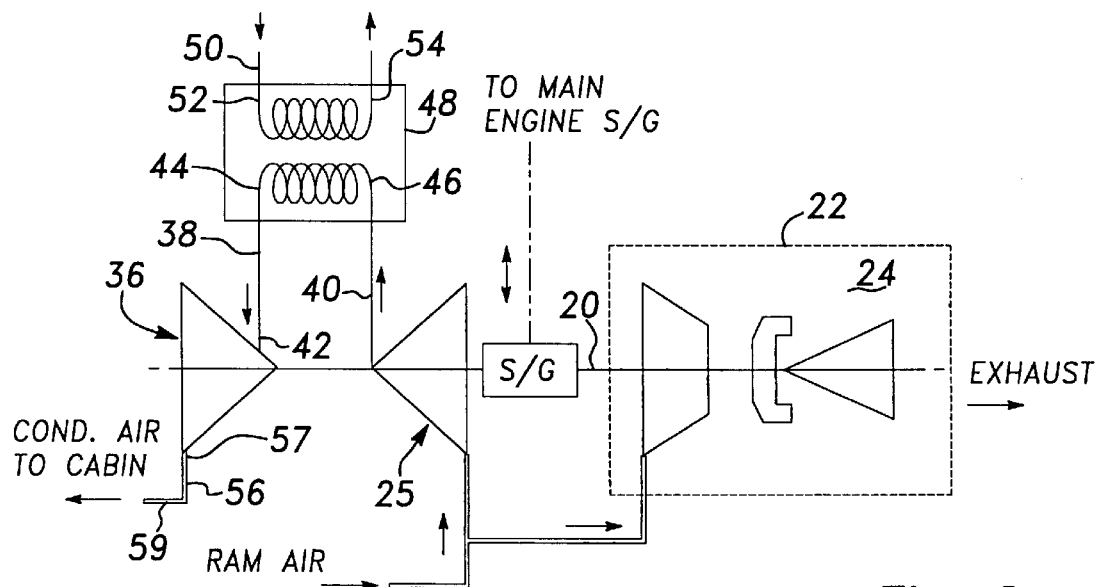
FIG. 2 is a schematic view of a second embodiment of the present invention including the features of FIG. 1 as well as a blowdown turbine and a heat exchanger.
Figure 3:
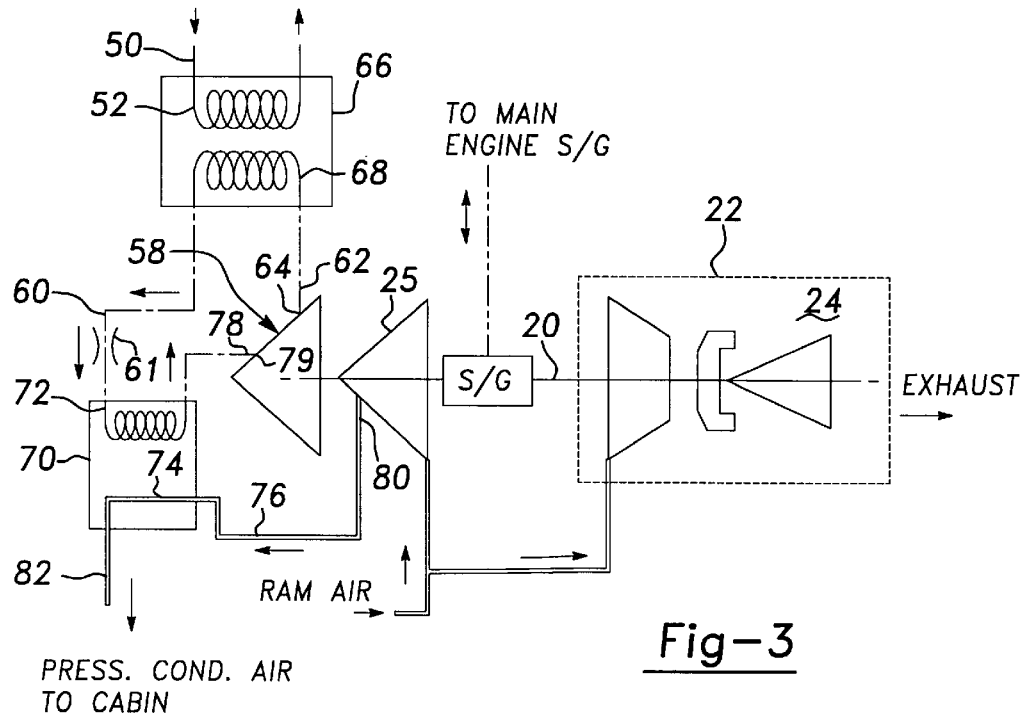
FIG. 3 is a schematic view of a third embodiment of the present invention including the features of FIG. 2 as well as a vapor cycle compressor, a condenser, and an evaporator.

The MMSPU can be configured in at least three separate embodiments as shown in FIGS. 1–3. In each of the configurations shown, a starter/generator unit 10 and a thermal engine portion 22 is common. The differences between the embodiments relate to the portion of the MMSPU that is used to perform the cabin pressurization and Environmental Control System (ECS) function.

In FIG. 1, a first embodiment of the MMSPU is shown generally at 14. An aircraft main engine 16 is disposed in a known manner on an aircraft body (not shown) and generates thrust for operating the aircraft. The main engine 16 includes a main engine starter/generator unit 18 coupled thereto for providing start-up power to the main engine in a motor mode and for generating electrical power from the main engine in a generator mode. The starter/generator unit 18 electrically communicates with a starter/generator unit 10 of the MMSPU 14 over wires or power bus 19 or other conventional means. Thus, electric power is delivered therebetween. The power bus 19 may also supply power to other loads or receive power from other sources (such as ground power source 12) and power may flow in either direction on the bus.

The starter/generator unit 10 is disposed along a central portion of a shaft 20 and is operably coupled thereto for operating in a generator mode or a motor mode. In a generator mode, the starter/generator unit 10 receives rotational energy from the shaft 20 for generating electrical power. In a motor mode, the unit 10 delivers electrical energy to the shaft 20 for causing rotation thereof.

A thermal engine 22 is operably coupled to an aft portion of the shaft 20 and preferably directs exhaust away from the starter/generator unit 10. In this embodiment, the thermal engine 22 is configured to function as a conventional Auxiliary Power Unit (APU) 24. Accordingly, the APU 24 is adapted to rotate the shaft 20 in order to provide supplemental electrical power through the starter/generator 10 in the event of an emergency power outage or for starting the main thrust engine 16.

A load compressor 25 is disposed along a fore portion of the shaft 20 and is coupled thereto for receiving rotational power which facilitates air compression. The load compressor 25 serves to pressurize air to a predetermined level prior to the air being delivered to the aircraft cabin. In this way, the cabin pressure is provided during operation in a fuel burning mode where the thermal engine 22 burns fuel and supplies power to the shaft 20, or in a motor non-fuel burning mode where the starter/generator 10 uses electrical power from the bus 19 to rotate the shaft 20.

A ram-air duct 26 interconnects the APU 24 and the load compressor 25 and leads to an external source of air. The ram-air duct 26 is provided for directing ram-air from the external source, preferably the atmosphere, generally to the MMSPU 14. The ram-air duct 26 includes a main conduit 28 having a first end 30 exposed to the atmosphere for receiving air therein. A second end 32 of the main conduit 28 is operably coupled to the APU 24 for supplying ram-air thereto. The ram-air duct 26 also includes a first branch 34 extending from the main conduit 28 between the first end 30 and the second end 32 for directing a portion of the ram-air to the load compressor 25.

The load compressor 25 acts on the ram-air supplied by the ram-air duct 26 so that it is sufficiently pressurized. The pressurized air is then delivered from the load compressor 25 to the aircraft cabin by a pressurized air conduit 33. The pressurized air conduit 33 is coupled at a first end 35 to the load compressor 25 for receiving pressurized air therein. A second end 37 of the pressurized air conduit 33 extends to the aircraft cabin for delivering pressurized air thereto.

It should be noted that the MMSPU depicted in FIG. 1 and subsequent figures has two distinct operating modes. In the first "normal" mode, power is supplied via the power bus 19 to the starter/generator 10. The starter/generator 10 is operably connected to the central shaft 20 of the MMSPU and operates in a motor mode for causing rotation thereof. Therefore, the thermal engine 22 is operating in a non-fuel burning mode and is rotating under the driving force of the shaft 20, but is not burning fuel or producing power. The starter/generator 10 also rotates the load compressor 25 to supply compressed air to the aircraft cabin via air conduit 33.

The normal mode is preferably implemented during normal flight cruise operation in which the starter/generator 18 on the main thrust engine 16 provides electrical power. The normal mode is also preferably implemented during ground operation at the terminal when electrical power is being supplied to the power bus 19 by means of an electrical connection to the ground power source 12.

In the second supplemental mode, the thermal engine 22 is operated as a conventional APU in a fuel burning mode, and provides rotational power to the shaft 20, which also drives the compressor 25 and the starter/generator 10. The electrical power generated by the starter/generator 10, which is operating in a generator mode, can be supplied to the power bus 19, either to drive connected electrical loads normally driven by the engine starter/generator 18, or to start the main engine 16 by means of electrical power supplied to engine starter/generator 18. Compressed air is delivered to the cabin by the compressor 25 in the supplemental mode in the same manner as in the normal mode.

The supplemental mode is preferably implemented when the aircraft is on the ground at a location where the ground power source 12 is not available. The supplemental mode is also preferably implemented during flight operations following a transition from the normal mode during an emergency in which electrical power for bus 19 is lost due to failure of the main engine 16 or the engine starter/generator 18. It should be noted that such an emergency transfer between the normal mode and the supplemental mode is facilitated by the fact that during the normal mode of operation, the thermal engine 22 is operating in a non-fuel burning mode and is rotating at operating speed. Thus, when fuel and ignition are supplied, the engine 22 immediately starts and begins to deliver power. It is also possible for the supplemental mode to be used after the aircraft is pushed away from the gate, such as during taxi, take off and climb, to provide back-up redundancy to the main engine power sources.

The embodiment depicted in FIG. 1 is capable of accomplishing the emergency power function described above and pressurizes the cabin by means of the load compressor 25. However, it does not provide a cooling function. In contrast, the second embodiment of the present invention, as shown in FIG. 2, includes additional equipment beyond the embodiment shown in FIG. 1 needed to provide an air-cycle cooling function. Specifically, a blow-down turbine 36 is disposed along the shaft 20 forward of the load compressor 25.

Referring now specifically to FIG. 2, the blow-down turbine 36 is coupled to the shaft 20 for receiving rotational power therefrom. A pressurized air conduit 38 is operably coupled at a first end 40 to the load compressor 25 for receiving pressurized ram-air therein. A second end 42 of the pressurized air conduit 38 is coupled to the blow-down turbine 36 for delivering cooled pressurized ram-air from the load compressor 25 thereto. The pressurized air conduit 38 also includes a central portion 44 configured to form a first half 46 of a heat-exchanger 48.

A fuel conduit 50 from the aircraft fuel system (see FIG. 4) includes a heat exchanging portion 52 which forms the second half 54 of the heat-exchanger 48. The central portion 44 of the pressurized air conduit 38 is disposed proximate the heat exchanging portion 52 of the fuel conduit 50 so that thermal energy is transferred therebetween. Preferably, the heat exchanging portion 52 and the central portion 44 are coiled or overlapped to increase the available surface area for heat exchanging within the heat exchanger 48. Thus, the ram-air pressurized in the load compressor 25 is cooled in the heat-exchanger 48 prior to being delivered to the blow-down turbine 36. The blow-down turbine 36 further cools the pressurized air as it is expanded to the proper cabin pressure. In addition, the turbine 36 recovers some of the energy from the expanding air and returns it via the shaft 20 to the compressor 25.

From the blow-down turbine 36, the conditioned air is directed to the aircraft cabin by a conditioned air conduit 56. The conditioned air conduit 56 includes a first end 57 coupled to the blow-down turbine 36 for receiving conditioned air therein. A second end 59 of the conditioned air conduit 56 leads to the aircraft cabin for delivering conditioned air thereto.

Turning now to FIG. 3, a third embodiment of the MMSPU is shown which includes a vapor cycle refrigerant air conditioning cooler or vapor cycle compressor 58. The compressor 58 is operably coupled to the shaft 20 for receiving rotational power therefrom. Preferably, the compressor 58 is disposed forward of the load compressor 25.

A vapor cycle conduit 60 is coupled at a first end 62 to a first outlet 64 of the vapor cycle compressor 58 for receiving compressed refrigerant therein. The vapor cycle conduit extends from the compressor 58 to a first heat exchanger/condenser 66 for cooling and condensing the compressed refrigerant therein. A heat exchanging portion 68 of the vapor conduit 60 is disposed within the condenser 66 proximate a heat-exchanging portion 52 of the fuel conduit 50. Accordingly, thermal energy is transferred therebetween.

The vapor conduit 60 extends from the first heat-exchanger/condenser 66 to an expansion value 61, where the refrigerant changes to vapor and continues onto a second heat-exchanger/evaporator 70. At the evaporator 70, a second heat-exchanging portion 72 of the vapor conduit 60 is disposed proximate a heat exchanging portion 74 of a pressurized conditioned air conduit 76. Accordingly, thermal energy is exchanged therebetween and the pressurized air from the compressor 25 is cooled.

A second end 78 of the vapor conduit 60 is coupled to the vapor cycle compressor 58 at an inlet 79 to complete the vapor conduit loop. It should be noted that the pressurized conditioned air conduit 76 is coupled at a first end 80 to the load compressor 25 for receiving pressurized air therein. A second end 82 of the pressurized conditioned air conduit 76 is located downstream from the heat exchanging portion 74 and provides pressurized conditioned air to the aircraft cabin.

The embodiment illustrated in FIG. 3 is preferably used in systems where vapor cycle refrigeration is more desirable than air-cycle cooling. Such system would likely be an installation in which liquid coolant is used for the cabin pressurization air, and in turn is cooled by the fuel mass by means of the heat exchanger 66. Other extensions to this embodiment include additional cooling loops, either by direct refrigerant or by means of secondary cooling fluid to such items as avionics.

Figure 4:
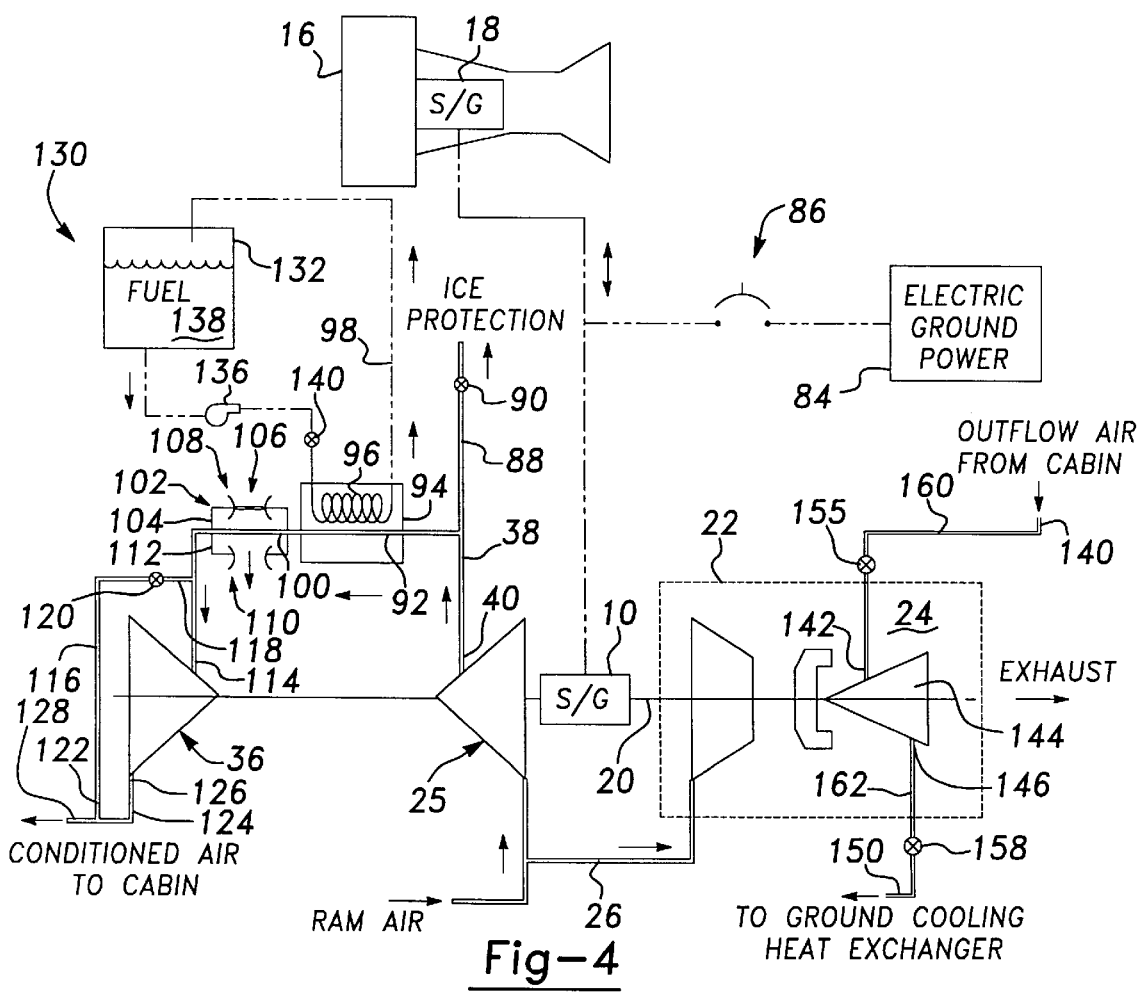
FIG. 4 is a more detailed schematic view of the second embodiment as shown in FIG. 2.

Referring now to FIG. 4, the second embodiment of the present invention is shown in greater detail with a preferred mechanization for facilitating use and control of the MMSPU. An electric ground power source 84 is electrically coupled to the starter/generator 10 of the MMSPU and to the starter/generator 18 of the main engine 16 for providing electric power thereto. A switch 86 is interposed between the electric ground power source 84 and both of the starter/generator units 10, 18.

The starter/generator unit 10 of the MMSPU is operably coupled to the shaft 20 for variably delivering or receiving rotational power in either its motor mode or its generator mode. The load compressor 25 is configured for pressurizing ram-air delivered thereto by the ram-air duct 26. The pressurized air conduit 38 is coupled at a first end 40 to the load compressor 25 for receiving pressurized air therein. A first branch 88 of the pressurized air conduit 38 extends therefrom to a valve 90 for controlling the amount of pressurized air permitted to pass therethrough. The first branch 88 serves to deliver uncooled pressurized ram-air from the compressor 25 to an ice protection system (not shown). The pressurized ram-air conduit 38 also includes a heat exchanging portion 92 passing through a first heat exchanger 94. The heat-exchanging portion 92 is disposed proximate a heat-exchanging coil 96 of the fuel system conduit 98. In this way, thermal energy is passed between the heat exchanging portion 92 of the pressurized air conduit 38 and the heat-exchanging coil 96 of the fuel system conduit 98.

The pressurized ram-air conduit 38 additionally includes a second heatexchanging portion 100 passing through ground cooling system 102 including a second heat exchanger 104. The second heat exchanger 104 includes a ground cooling fan 106 for directing cooling air across the second heat exchanging portion 100. An inlet port 108 and an outlet port 110 are formed in a housing 112 of the second heat exchanger 104 to facilitate entry and exit of the cooling air. The pressurized ram-air within the pressurized ram-air conduit 38 is cooled by passing the cooling air thereacross.

From the ground cooling system 102, a blow-down turbine section 114 of the pressurized ram-air conduit 38 extends to the blow-down turbine 36 for delivering cooled pressurized ram-air thereto. A bypass conduit 116 is coupled at a first end 118 to the blow-down turbine conduit 114 upstream from the blow-down turbine 36. The bypass conduit 116 allows a portion of the pressurized ram-air to bypass the blow-down turbine 36.

A valve 120 is interposed along the bypass conduit 116 to vary the volume of bypass air permitted to travel therethrough. A second end 122 of the bypass conduit 116 is coupled to a conditioned air 124 conduit. The conditioned air conduit 124 is coupled at a first end 126 to the blow-down turbine 36. A second end 128 of the conditioned air conduit 124 directs conditioned air to the aircraft cabin.

The fuel system 130 includes an aircraft fuel tank 132 and a closed circuit fuel conduit 98 extending therefrom. A pump 136 is disposed along the closed circuit fuel conduit 98 downstream from the reservoir 132 for pumping fuel 138 to the first heat exchanger 94. A valve 140 is disposed along the closed circuit fuel conduit 98 downstream from the pump 136 for varying the volume of fuel 138 permitted to flow therethrough. Preferably, the pump 136 and the valve 140 are disposed upstream from the first heat exchanger unit 94. From the heat exchanger unit 94, the closed circuit fuel conduit 98 returns to the fuel tank 132.

Still referring to FIG. 4, the thermal engine portion 22 of the MMSPU is preferably operated in a non fuel-burning mode with motive power being supplied by the electrical ground power source 84 in a ground air conditioning mode. The electrical ground power source 84 drives the MMSPU Starter/Generator 10 in a motor mode to turn the load compressor 25 via the shaft 20 to compress the cabin supply air.

The compressed air is then cooled either by the fuel cooled heat exchanger 94 or the ground cooling system fan 106 or both. This cooled, high-pressure air is then expanded rough the blowdown turbine 36 to reduce pressure and further cool it to the correct air conditioning temperature.

In this process, the energy extracted from the air by the heat exchangers 94, 104 is generally lost, but the energy extracted by the blowdown turbine 36 is fed back to the compressor 25 via the drive shaft 20 which reduces the amount of power required from the Starter/Generator 10. Control of the lost energy, and the delivered air temperature and pressure, is accomplished by adjustments to the valves 120, 140 as well as the cooling fuel recirculation rate and the Starter/Generator 10 input power.

In this mode, when an electrical ground power source 84 is available, the MMSPU operates as an electrically driven air-cycle air conditioning unit, instead of the conventional air-cycle machine driven by a noisy, polluting fossil fuel-burning engine. When the electrical ground power source 84 is not available, the MMSPU operates in a fuel-burning mode to supply air conditioning and electrical power.

Also, when the electrical ground power source 84 is not available, the MMSPU is operated in the fuel-burning mode to drive the MMSPU Starter/Generator 10 to produce power to drive the Starter/Generator unit 18 on the main engine 16 to start the main engine 16. After staring the main engine 16, the MMSPU Starter/Generator 10 is paralleled with the main engine generator 18 so that both fuel burning engines 16, 24 may power the load compressor 25 and blowdown turbine 36 during air-cycle refrigeration and cabin air compressor operations. This operating condition is preferably maintained throughout aircraft taxi, take off, and climb to cruise altitude when cruise conditions are achieved.

In the normal take off mode, the MMSPU is preferably operated in the fuel-burning mode to provide cabin air cooling and back-up electrical power during this critical phase of flight. In this mode, the MMSPU fulfills the function that the conventional APU and air-cycle ECS systems perform. The advantage is that this function is accomplished with only one machine.

If ice protection is required during these phases of flight, the compressed air from the load compressor 25, prior to being cooled, may be used by opening valve 90. Ice protection may also be accomplished by converting electrical power to thermal energy with resistance heating units.

Also, during this time, in either the case of a main engine 16, or a main engine Starter/Generator unit 18 failure, electrical power can be furnished to the aircraft electrical system by the MMSPU Starter/Generator unit 10. In this event, the MMSPU thermal engine 22 maintains the function of the air conditioning and pressurization by powering the load compressor 25 and blowdown turbine 36 directly.

Thus, during these flight regimes, the MMSPU accomplishes the functions of a conventional APU, ECS machines, and provides ice protection, both in the normal and engine out case. This is particularly significant in the emergency engine out condition, where conventionally, the remaining engine is burdened not only with providing additional thrust, but also with supplying bleed air for cabin pressurization and ice protection.

Once cruise conditions are established, the thermal engine 22 of the MMSPU is preferably turned off and the unit is operated in a non fuel-burning mode. In this mode, the power for the compressor 25 and the turbine 36 is supplied electrically from the main engine Starter/Generator unit 18 to the MMSPU Starter/Generator unit 10. This is possible, because in the cruise portion of the flight, the main engine generators 18 usually provide excess capacity due to lower secondary power system demands. The advantage in this case is that the cabin air pressurization is now accomplished by the more economical shaft power extraction from the main engines 16, rather than the very wasteful fuel-inefficient air bleed extraction conventionally done. Another advantage is that the MMSPU, being driven in the unfired, non-fuel burning mode is available to instantly start up and run in the fuel-burning emergency power mode in the event of main engine 16 or main engine electrical generator 18 failure.

If an emergency should materialize during cruise, such as loss of the main engine 16 or power from the main engine generator 18, the thermal engine 22 may be immediately started and operated in a fuel-burning mode to make up for the lost power. The advantage over conventional APUs is that the thermal engine 22 is already turning at operating speed. Therefore, minimal delay is experienced prior to starting the thermal engine 22. Also, since the thermal engine 22 is started by the Starter/Generator unit 10, which is driven by ac power from the main electrical power system 18, or by the remaining engine(s), the emergency power dc battery is not discharged during the start-up. The thermal engine 22 would also continue to supply cabin pressurization and cooling. This action would be similar to that of an APU which is designed to start and operate at cruise altitude, but the advantage is that in the case of the MMSPU, the machine is already turning at operating speed, and is thus easier to start.

Prior to descending, the MMSPU is preferably changed to the fuel-burning mode (unless it was previously changed to this mode during an emergency as previously described), and operated in this mode throughout the remainder of the flight, including decent, landing, taxi-in, and passenger unloading, or until the aircraft is connected to an electrical ground power source 84. During this time, the MMSPU operates in the same manner and produces the same benefits as during the take-off and climb phases of the flight. For instance, during descent and landing, the MMSPU is normally operated in the fuel-burning mode to provide back-up power for the aircraft electrical power system, and at the same time provide both electrical and pneumatic power as required for the ice protection function.

An additional feature shown of the MMSPU embodiment depicted in FIG. 4 is the routing of the cabin outflow air through the turbine section 144 of the thermal engine 22 during non-fuel burning mode operations. Air from the cabin is conducted through an air flow duct 160 to the thermal engine 22. The duct 160 is connected at a first end 140 to the aircraft cabin and is connected at a second end 142 to the turbine 144 of the thermal engine 22. An isolation valve 155 is disposed along the duct 160 upstream of the turbine 144 for controlling air flow through the duct 160. A second duct 162 is connected at a first end 146 to the turbine 144 and is connected at a second end 150 to the ground cooling heat exchanger 102 at port 108. An isolation valve 158 is disposed along the duct 162 in between the first end 146 and the second end 150 for controlling air flow therethrough. Accordingly, the cabin outflow air, which is further cooled by expansion through the turbine 144, cools the compressed cabin inlet air.

This feature may also be incorporated into other embodiments of the present invention to simultaneously reduce windage friction energy losses during times when the thermal engine 22 is turning but not burning fuel and to recover a portion of the energy invested in pressurizing the cabin air, rather than wasting it by throttling it overboard through an outflow regulating valve.

The other embodiments of the MMSPU shown in FIGS. 1 and 3 operate in a similar manner to that described above. However, the first embodiment shown in FIG. 1 only provides the cabin pressurization function and the emergency power functions (and preferably the hot-air ice protection function) described above. Air cooling is preferably supplied in this embodiment by means of a separate electrically powered vapor cycle refrigeration system.

The third embodiment shown in FIG. 3 provides all of the functions described above for the second embodiment, but includes a hybrid configuration in which the cooling function is provided by a shaft-driven vapor cycle refrigeration unit 58 integral with the MMSPU. The advantage of this arrangement is that liquid-to-liquid heat exchangers could be provided at the location of the refrigerant evaporator 70, so that a compact means of distributing cooling, such as for power-electronics and avionics, is available. Otherwise, the operation of the MMSPU throughout the flight regimes is essentially the same as described for the second embodiment above. It should be understood that all embodiments of the present invention include a bi-directional power processor/motor controller to process power from the starter/generator 10 when it is used to produce power, and to control the starter/generator 10 as a motor when the MMSPU is being driven by the aircraft electrical power system 18.

A major advantage of the MMSPU is that it combines mechanical and electrical equipment in such a way that the same basic equipment or major parts are used to perform a multiplicity of functions. In this manner, a minimum amount of equipment is required to be installed on the aircraft to perform the several functions of air conditioning, emergency power, and cabin air compression. Also, since engine bleed air is not extracted from the main thrust engines 16 under any conditions, all the bleed ports and hot air ducts may be omitted from the design. This improves the fuel consumption characteristic of the engine 16, since the engine compressor flow rate always operates in match with the design flow rate of the engine power turbine. This is particularly important when considering future hi-bypass turbo-fan engines which may have a bleed air demand for ECS and ice protection on the order of twenty-five percent (25%) of the total core flow.

The elimination of bleed air extraction from the engine is also advantageous in that the considerable space required to mount the bleed air ducts in the engine nacelle and the engine mounting pylon is no longer required. Also, the burst duct detectors which are presently required where hot air ducts pass through pressurized compartments are no longer needed.

The bleed air pre-cooler, which is usually mounted in the pylon is also no longer required. Since the present invention does not require the pre-cooler, and the ECS inter-cooler is fuel cooled, ram air drag for these items is eliminated, thereby increasing the fuel efficiency of the aircraft.

It should be noted that the MMSPU may be used or applied in many other situations in which a multiplicity of energy conversions is desired to be accomplished at a single point. Power flow may be from the unit to the distribution network, or from the network to the MMSPU. Also, the common shaft-mounted equipment is not limited to those previously described, but may include such components as pumps for water or hydraulic systems, or liquid phase turbines. Some examples of other applications include stationary operation in refinery or processing plants, portable operation as an aircraft support ground power unit, other mobile applications such as on ocean ships, military armored vehicles, and heavy trucks or busses.

Thus, the present invention provides a modified aircraft auxiliary power unit, preferably of the gas turbine type, combined with a motor/generator unit and a load compressor to produce an air conditioning/environmental control module which also serves as a source for emergency electrical power and electrical power to start the main thrust engine. The present invention is able to process air from any ram-air source and use this processed air to pressurize and cool the cabin and equipment without the requirement for engine bleed air. According to the invention, the same unit also acts as a fuel powered emergency or supplemental electrical power source or ECS source in a stand-alone mode. Therefore, no engine power extraction is required.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A multi-mode secondary power unit comprising:
   a shaft;
   a first starter/generator unit operably coupled to said shaft;
   said first starter generator motor being operable in a motor mode for causing rotational movement of said shaft and being operable in a generator mode for generating electric power from rotational movement of said shaft;
   a thermal engine operably coupled to said shaft;
   said thermal engine being operable in a fuel burning mode for causing rotational movement of said shaft and being operable in a non-fuel burning mode for receiving rotational movement from said shaft; and
   a load compressor operably coupled to said shaft for pressurizing air to a predetermined level;
   a vapor cycle compressor operably coupled to said shaft for pressurizing coolant to a predetermined level;
   a vapor cycle conduit coupled to said vapor cycle compressor;
   a pressurized conditioned air conduit coupled to said load compressor; and
   said vapor cycle conduit being disposed in a thermal exchanging relation to said pressurized conditioned air conduit;
   a fuel conduit;
   a heat-exchanging section of said fuel conduit disposed in a first heat exchanger/condenser;
   a first heat exchanging portion of said vapor cycle conduit disposed within said first heat exchanger/condenser proximate said heat-exchanging section of said fuel conduit such that thermal energy is transferred therebetween;
   a second heat-exchanging portion of said vapor conduit disposed within a second heat-exchanger/evaporator; and
   a portion of said pressurized conditioned air conduit disposed in said second heat-exchanger/evaporator proximate said second heat exchanging portion of said vapor conduit such that thermal energy is transferred therebetween.

2. The unit of claim 1 further comprising a ram-air duct interconnecting said thermal engine and said load compressor, said ram-air duct having a first end extending to a source of air.

3. The unit of claim 2 further comprising at least one heat exchanging portion of said vapor cycle conduit disposed within at least one heat exchanger/condenser.

4. The unit of claim 1 further comprising an electric ground power source electrically coupled to said first starter/generator for providing electric power thereto.

5. The unit of claim 1 further comprising:

a main engine;

a second starter/generator unit operably coupled to said main engine;

said second starter/generator unit being operable in a starter mode for providing start-up electrical power to said main engine and being operable in a generator mode for generating electrical power from said main engine;

said second starter/generator unit electrically communicating with said first starter/generator unit.

6. A multi-mode secondary power unit comprising:

a shaft;

a first starter/generator unit operably coupled to said shaft;

said first starter generator motor being operable in a motor mode for causing rotational movement of said shaft and being operable in a generator mode for generating electric power from rotational movement of said shaft;

a thermal engine operably coupled to said shaft;

said thermal engine being operable in a fuel burning mode for causing rotational movement of said shaft and being operable in a non-fuel burning mode for receiving rotational movement from said shaft; and a load compressor operably coupled to said shaft for pressurizing air to a predetermined level;

a blow-down turbine operably coupled to said shaft for cooling and expanding said air;

a main engine;

a second starter/generator unit operably coupled to said main engine;

said second starter/generator unit being operable in a starter mode for providing start-up electrical power to said main engine and being operable in a generator mode for generating electrical power from said main engine;

said second starter/generator unit electrically communicating with said first starter/generator unit;

an electric ground power source electrically coupled to said first starter/generator and to said second starter/generator for providing electric power thereto;

a ram-air duct interconnecting said thermal engine and said load compressor, said ram-air duct having a first end extending to a source of air;

a pressurized air conduit interconnecting said load compressor and said blow-down turbine;

a bypass circuit coupled to said pressurized air conduit upstream from said blow-down turbine; and at least one heat exchanger disposed in a thermal exchanging relation to said pressurized air conduit.

7. The unit of claim 6 further comprising-a switch interposed between said electric ground power source and said first and said second starter/generators.

8. The unit of claim 6 further comprising a valve interposed in said bypass circuit to vary the volume of bypass air permitted to pass therethrough.

9. The unit of claim 6 further comprising:

a first branch of said pressurized air conduit extending to an ice protection system; and a second valve interposed along said first branch to vary the volume of air permitted to pass therethrough.

10. The unit of claim 6 wherein said at least one heat exchanger further comprises:

a heat exchanging portion of said pressurized air conduit disposed within a first heat exchanger unit; and a fuel system conduit including a heat-exchanging coil disposed in said first heat exchanger unit proximate said heat-exchanging portion such that thermal energy is passed therebetween.

11. The unit of claim 10 wherein said at least one heat exchanger further comprises:

a second heat-exchanging portion of said pressurized ram-air conduit disposed within a second heat exchanger unit;

a cooling fan disposed in said second heat exchanger unit such that said fan directs air across said second heat exchanging portion to disperse thermal energy therefrom.

12. The unit of claim 10 further comprising:

a conditioned air conduit interconnecting said blow-down turbine and said bypass circuit, said conditioned air conduit having a first end to a desired location for directing conditioned air thereto.

13. The unit of claim 10 further comprising:

a fuel reservoir coupled to said fuel system conduit;

a pump operably disposed along said fuel system conduit for pumping fuel from said fuel reservoir through said fuel system conduit;

a valve operably disposed along said fuel system conduit for varying the volume of fuel permitted to flow therethrough.

14. The unit of claim 6 further comprising:

a cabin outflow air conduit interconnecting an aircraft cabin and a turbine section of said thermal engine; and a routing duct interconnecting said turbine section and said at least one heat exchanger.

15. For an aircraft, a multi-mode secondary power unit forming an air conditioning/environmental control module, said control module comprising:

a shaft;

a first starter/generator unit operably coupled to said shaft;

said first starter generator motor being operable in a motor mode to cause rotational movement of said shaft and being operable in a generator mode to generate electric power from rotational movement of said shaft;

a thermal engine operably coupled to said shaft;

said thermal engine being operable in a fuel burning mode for causing rotational movement of said shaft and being operable in a non-fuel burning mode for receiving rotational movement from said shaft; and a load compressor operably coupled to said shaft for pressurizing air to a predetermined level to be subsequently used to pressurize a cabin of said aircraft;

a main engine;

a second starter/generator unit operably coupled to said main engine;

said second starter/generator unit being operable in a starter mode for providing start-up electrical power to said main engine and being operable in a generator mode for generating electrical power from said main engine;

a bi-directional electrical power bus for selectively providing electrical power from said first starter/generator unit to said second starter/generator unit or from said second starter/generator unit to said first starter/generator unit;

a ram air duct operably coupled to said thermal engine and said load compressor, said ram air duct having a first end exposed to the atmosphere so as to receive fresh air therethrough, a first branch for supplying a first sub-quantity of said fresh air to said thermal engine, and a second branch for supplying a second sub-quantity of said fresh air to said load compressor; and a connector operably associated with said bi-directional power bus and adapted to be coupled to a ground based electrical power source to supply electrical power to at least one of said first and second starter/generator units.

16. For an aircraft, a multi-mode secondary power unit forming an air conditioning/environmental control module, said control module comprising:

a shaft;

a first starter/generator unit operably coupled to said shaft;

said first starter generator motor being operable in a motor mode to cause rotational movement of said shaft and being operable in a generator mode to generate electric power from rotational movement of said shaft;

a thermal engine operably coupled to said shaft;

said thermal engine being operable in a fuel burning mode to cause rotational movement of said shaft and being operable in a non-fuel burning mode to receive rotational movement from said shaft; and a load compressor operably coupled to said shaft for pressurizing air to a predetermined level to be subsequently used to pressurize a cabin of said aircraft;

a main engine;

a second starter/generator unit operably coupled to said main engine;

said second starter/generator unit being operable in a starter mode for providing start-up electrical power to said main engine and being operable in a generator mode for generating electrical power from said main engine;

a bi-directional electrical power bus for selectively providing electrical power from said first starter/generator unit to said second starter/generator unit or from said second starter/generator unit to said first starter/generator unit;

an electric power and ground cable electrically coupled to said bi-directional electrical power bus for providing electric power thereto when coupled to a ground-based power source;

a ram air duct operably coupled to said thermal engine and said load compressor, said ram air duct having a first end exposed to the atmosphere so as to receive fresh air therethrough, a first branch for supplying a first sub-quantity of said fresh air to said thermal engine, and a second branch for supplying a second sub-quantity of said fresh air to said load compressor;

a connector in communication with said electric power and ground cable and adapted to be coupled to said ground based electrical power source to supply electrical power to at least one of said first and second starter/generator units; and a blow down turbine operably associated with said shaft for receiving said pressurized air from said load compressor and cooling said pressurized air prior to discharging said air into said cabin of said aircraft.

* * * * *